June 26, 1956 K. M. HANSON 2,752,429
MAGNETIC AMPLIFIER
Filed Jan. 7, 1952
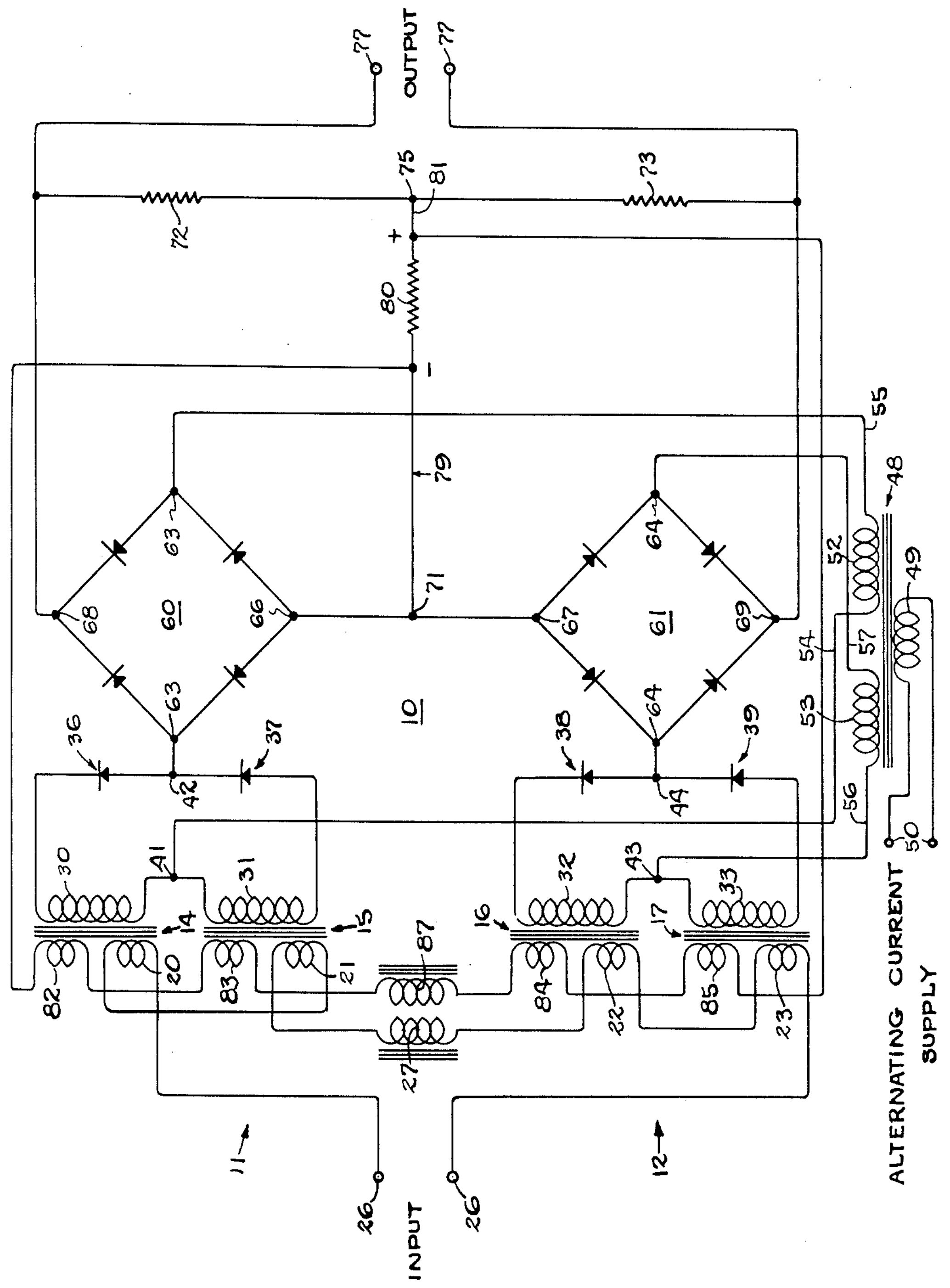
INVENTOR
Karl M. Hanson
By Carlson, Pitzner, Hubbard & Wolfe
ATTORNEYS 2,752,429
Patented June 26, 1956

1

2,752,429

MAGNETIC AMPLIFIER

Karl M. Hanson, Rockford, Ill., assignor to Woodward Governor Company, Rockford, Ill., a corporation of Illinois Application January 7, 1952, Serial No. 265,271

6 Claims. (Cl. 179—171)

The present invention relates to magnetic amplifiers and more particularly to such amplifiers of the push-pull type.

An object of the invention is to provide a push-pull magnetic amplifier having unusually good linearity of response over a wide range of input signal voltages, and usually good stability of operation when subjected to variations in such external conditions as temperature and power supply voltage.

Another object is to provide an improved push-pull magnetic amplifier in which the combined output current is utilized to provide a stabilizing bias.

A further object is to provide a magnetic amplifier in which the output currents of a pair of sections connected in push-pull relation are combined and utilized to provide a stabilizing bias.

A further object is to provide a magnetic amplifier in which the combined output currents of a plurality of saturable reactors, connected in push-pull relation, are utilized to provide a stabilizing bias for the reactors.

Other objects and advantages will become apparent as the following description proceeds, taken in conjunction with the accompanying drawing in which the single figure is a schematic circuit diagram of a magnetic push-pull amplifier embodying the features of the invention.

The improved magnetic amplifier 10 shown in the drawing by way of illustration includes a pair of amplifier sections 11 and 12 connected in push-pull relation. A pair of saturable reactors 14 and 15 are included in the first section 11, and similar reactors 16 and 17 are found in the second section 12. The saturable reactors 14–17 comprise respective control or input windings 20, 21, 22, and 23, all of which are connected in series across a pair of input terminals 26. In the present instance, an audio reactor or choke coil 27 is inserted in series with the primary windings, preferably between the windings 21 and 22.

The saturable reactors 14 and 17 have respective secondary or main windings 30, 31, 32, and 33 which are connected in series with individual half-wave rectifiers 36, 37, 38, and 39. The series combination of the main winding 30 and the rectifier 36 is connected in parallel with the series combination of the winding 31 and the rectifier 37 between a pair of junction terminals 41 and 42 in the first amplifier section 11. In like manner, the series combination of the winding 32 and the rectifier 38 in the second amplifier section is connected in parallel with the series combination of the winding 33 and the rectifier 39, between a pair of junction terminals 43 and 44. The rectifiers 36 and 37 are polarized to carry positive and negative current between the terminals 41 and 42. In like manner, the rectifiers 38 and 39 are oppositely polarized. In accordance with the usual push-pull arrangement, the input windings 20 and 21 have a polarity which is opposite from that of the input windings 22 and 23, with respect to the current directions in the main windings 30–33.

2

Power for the magnetic amplifier 10 is supplied in this instance by a transformer 48 having a primary winding 49 connected to a pair of alternating current supply terminals 50. The alternating current supply may be at any of the conventional frequencies, but preferably is at 400 cycles. The power transformer 48 has separate secondary windings 52 and 53 for the two amplifier sections 11 and 12. The windings 52 and 53 include respective pairs of terminal leads 54 and 55, and 56 and 57. The terminal leads 54 and 56 of the windings 52 and 53 are connected respectively to the junction terminals 41 and 43 of the amplifier sections 11 and 12.

The exemplary amplifier 10 is provided with full-wave bridge-type output rectifiers 60 and 61 which are interposed respectively between the power leads 55 and 57 and the junction terminals 42 and 44. The bridge rectifiers 60 and 61 include respective pairs of input terminals 63 and 64. One of the input terminals 63 of the rectifier 60 is connected to the junction terminal 42, and the other is connected to the power lead 55. Likewise, one of the bridge rectifier input terminals 64 is connected to the junction terminal 44 and the other is connected to the power lead 57.

The bridge rectifiers include respective negative output terminals 66 and 67 as well as respective positive output terminals 68 and 69. The negative output terminals 66 and 67 are connected to a common terminal or junction 71. Load resistors 72 and 73 are connected between the positive output terminals 68 and 69 of the bridge rectifiers and a common terminal or junction 75. The amplifier 10 includes a pair of output terminals 77 which are connected to the positive terminals 68 and 69 respectively.

The common terminals or junctions 71 and 75 are interconnected by means including a common lead 79 which carries the combined output currents of the amplifiers 11 and 12. In accordance with the present invention, the current in this common lead 79 is utilized to bias the reactors 14–17. In this instance, a resistor 80 of relatively small value, compared to the values of the load resistors 72 and 73, is connected in series with the common lead 79. The saturable reactors 14, 15, 16, and 17 preferably include separate biasing windings 82, 83, 84, and 85 which are connected in series across the resistor 80. An audio reactor or choke 87 preferably is connected in series with the biasing windings 82–85, in this instance between the windings 83 and 84. The biasing windings 82–85 are polarized so that the magnetizing action of the biasing current in the windings tends to oppose the magnetizing action of the currents in the main windings 30–33. In other words, the biasing windings are polarized so that the biasing current tends to reduce the currents in the main windings 30–33.

The amplifier 10 is placed in operation by supplying alternating power to the terminals 50 and making suitable signal connections to the terminals 26 and 77. When no input signal is being supplied to the input terminals 26, the two sections 11 and 12 of the amplifier are substantially balanced. Approximately equal alternating currents are supplied to the amplifier sections by the power transformer windings 52 and 53. In the respective amplifiers sections, the windings 31 and 33 carry the positive half-cycles of the alternating currents while the windings 30 and 32 carry the negative half-cycles. Thus the currents in the windings 30–33 consist of direct current components as well as alternating current or ripple components. The direct current components produce partial saturation of the reactors 14–17.

The alternating currents flowing through the main winding pairs 30, 31 and 32, 33 are rectified by the output rectifiers 60 and 61 in order that the amplifier sections 11 and 12 may produce direct output voltages. These direct voltages are connected in opposition across the output terminals 77.

The direct output voltages developed by the bridge rectifiers 60 and 61 produce output currents in the resistors 72 and 73, and both of these output currents flow in the common lead 81 and the resistor 80. The output currents are polarized so as to be additive in the common lead. The resistor 80 diverts part of the combined output currents through the biasing windings 82-85. The effect of the biasing currents is to reduce the currents in the main windings 30—33 below the values that would exist if the biasing windings were disconnected.

When a direct current input signal is supplied to the input terminals 26, the resulting current through the control windings 20—23 changes the degree of saturation of the reactors 14—17, and in this way changes the impedance of the main windings 30—33. Due to the push-pull arrangement of the reactor pairs 30, 31 and 32, 33, the saturation of one pair of reactors is increased and the saturation of the other pair is decreased. In a known manner, the provision of the divided main windings 30, 31 and 32, 33 in combination with the half-wave rectifiers 36—39, produces a regenerative feedback effect which enhances the sensitivity of the amplifier. Due to the rectifiers, the currents in the split main windings are unidirectional. For this reason, the main winding currents affect the saturation of the reactors. An increase in any one of the main winding currents increases the saturation of the corresponding reactor and thereby decreases the impedance of the main winding, so that the current tends to increase still further. A reverse effect takes place when the main winding current decreases.

Thus, an input signal at the input terminals 26 increases the reactor currents in one of the amplifier sections 11 or 12, and decreases the reactor currents in the other amplifier section. Likewise, the unidirectional output current in one of the resistors 72 or 73 increases, while the output current in the other resistor decreases. However, the combined current in the common lead 79 and hence in the biasing resistor 80 and the biasing windings 82—85, remains relatively constant. Any change in the current in the common lead 81 is generally indicative of nonlinear response of the amplifier 10. The choke coil 27 filters the input current which passes through the control windings 20—23 and suppresses any currents in the input circuit due to ripple frequency voltages induced in the control windings by the main windings 30—33. In this way, the choke coil 27 prevents any serious interference between the amplifier 10 and a previous amplifier stage or other device connected to the input terminals 26. The reactor 87 in the biasing circuit smooths out any ripple existing in the current in the common lead 81. In other words, the reactor 87 filters the biasing current in the windings 82—85 so that a truly direct current is obtained. A further effect of the reactor 87 is to provide a high impedance in series with the bias windings for suppressing currents due to ripple frequency voltages induced into the bias windings by the main windings 30—33. It has been found that the inclusion of the reactor 87 in the biasing circuit increases the speed with which the amplifier 10 responds to a signal.

It has been found that utilizing the current in the common lead for biasing the saturable reactors results in a substantial improvement in the linearity of the amplifier 10. Thus any change in the biasing current due to nonlinearity of response tends to shift the condition of the amplifier to a point more conducive to linearity. Deriving a biasing current from the current in the common lead tends to stabilize the latter current.

Biasing the saturable reactors with the current in the common lead also had the important advantage of stabilizing the operation of the amplifier when it is subjected to variations in external conditions such as temperature and the voltage of the alternating current supply. Any change in the biasing current due to a change in external conditions is self-inhibiting. In other words, the effect of the biasing current is to counteract any change in external conditions. For example, an increase of the alternating current supply voltage, across the terminals 50, tends to increase the current in the common lead 81. However, this change in the common lead current increases the biasing current and thereby tends to increase the reactance of the reactors 14—17 so that the final increase in the common current is less than would otherwise be experienced.

Along with improved linearity and stability, the present invention contributes an increased measure of economy and practicability. The need for any external bias supply is eliminated. In this way, savings are effected in complexity, cost, weight, and space.

I claim as my invention:

1. A push-pull magnetic amplifier, comprising, in combination, two pairs of saturable reactors having respective main, control and bias windings, two full wave rectifiers having respective pairs of input and output terminals, two alternating current sources, two pairs of half-wave rectifiers, leads connecting said main windings of each pair of said reactors in a parallel combination and connecting said parallel combination in series with one of said sources and with said input terminals of one of said full-wave rectifiers, one pair of said half-wave rectifiers being interposed in series with each pair of said respective main windings, said half-wave rectifiers of each pair being oppositely polarized so that one said main winding of each pair carries positive current and the other carries negative current, amplifier input leads interconnecting the two control windings of each pair of said reactors and connecting said two interconnected control windings of one pair in push-pull with said two interconnected control windings of the other pair, the respective output terminals of one polarity of said full-wave rectifier being connected together, a pair of load devices connected in series between the other output terminals of said full-wave rectifiers, a resistor connected between the common connection of said one polarity full-wave rectifier terminal and the junction of said load devices, means connecting said bias windings in series across said resistor to be energized by a voltage across said resistor proportional to the sum of currents through said two full-wave rectifiers, said bias winding being polarized oppositely to said respective main windings, and an inductive choke in series with said bias windings.

2. A stabilized push-pull magnetic amplifier, comprising in combination, two pairs of saturable reactors having respective main, control and bias windings, two full-wave rectifiers having respective pairs of input and output terminals, two alternating current sources, two pairs of half-wave rectifiers, leads connecting said main winding of each pair of said reactors in a parallel combination and connecting said parallel combination in series with one of said sources and with said input terminals of one of said full-wave rectifiers, one pair of said half-wave rectifiers being interposed in series with each pair of said respective main windings, said half-wave rectifiers of each pair being oppositely polarized so that one said main winding of each pair carries positive current and the other carries negative current, amplifier input leads connecting all of said control windings in series and in push-pull relation, a junction interconnecting two of said full-wave rectifier output terminals of like polarity, a pair of load devices connected in series between the other two full-wave rectifier output terminals, and means connecting said bias winding in series between the junction of said two output terminals of like polarity and the junction of said load devices and said second junction lead to provide a current through said bias windings proportional to the sum of the two full wave rectifier output currents.

3. A stabilized push-pull magnetic amplifier, comprising in combination, two magnetic amplifier sections, each of said sections including a saturable reactor having main, control and bias windings, an alternating current source, a full-wave rectifier having a pair of input terminals and a pair of output terminals, and means connecting said source, said main winding, and said input terminals in series; input leads connecting said control windings of said two amplifiers in push-pull; a junction connecting two of said rectifier output terminals of like polarity; a pair of load devices connected in series between the other two of said output terminals, and means connecting said bias windings of said two amplifier sections between said output terminal junction and the junction between said load devices to provide currents in said bias windings proportional to the sum of the output currents of said rectifiers, said bias windings being polarized so that the current therein will reduce the steady state output currents in said main windings of said respective amplifier sections.

4. A stabilized push-pull magnetic amplifier, comprising in combination, two magnetic amplifier sections; each of said sections including a saturable reactor having main, control and bias windings, an alternating current source, a full-wave rectifier having a pair of input terminals and a pair of output terminals, and means connecting said source, said main winding, and said input terminals in series; input leads connecting said control windings of said two amplifiers in push-pull; means for connecting said output terminals in push-pull to afford an output signal proportional to the difference between the output currents of said rectifiers; and means for providing a biasing current through said bias windings proportional to the sum of the output currents of said rectifiers.

5. A stabilized push-pull magnetic amplifier, comprising, in combination, a pair of magnetic amplifier sections; each of said sections including a saturable reactor having a main winding and a control winding, biasing means for providing an initial flux in said reactor, an alternating current source, and an output circuit connected in series with said main winding and said source; input means for connecting said control windings in push-pull, output means connecting said output circuits in push-pull to provide a final output signal proportional to the difference between the respective output signals of said amplifier sections; means for deriving a biasing current proportional to the sum of the output signals of said respective amplifier sections; means for connecting said last-mentioned means to said biasing means so that said biasing current will be applied thereto; said biasing means being polarized so that said biasing current tends to reduce the steady state output signals from said respective amplifiers.

6. A stabilized push-pull magnetic amplifier, comprising, in combination, a pair of magnetic amplifier sections; each of said sections including a saturable reactor having a main winding and a control winding, an alternating current source, and an output circuit connected in series with said main winding and said source; input means for connecting said control windings in push-pull; output means connecting said respective output circuits in push-pull to provide a final output signal proportional to the difference between the output signals of said respective amplifier sections; means for combining the output signals of said sections to derive a biasing current proportional to the sum of the output signals of said respective sections; and biasing means for utilizing said biasing current to bias said reactors and thereby stabilize said amplifier.

References Cited in the file of this patent

Publication: AIEE Technical Paper 47–48, January 1947, "A Balanced Amplifier Using Biased Saturable Core Reactions," pp. 1 to 12 and 4 pages of drawings (see Figs. 5 and 6).

Publication: Proceeding of the Institute of Electrical Engineers, vol. 96, part I, March 1949, "A Theoretical and Experimental Study of the Series-Connected Magnetic Amplifier," by Gale and Atkinson, pp. 100–113 (see Fig. 24).

Publication: AIEE Miscellaneous Paper 50–93, December 1949, "Magnetic Amplifiers of the Balance Detector Type—Their Basic Principles, Characteristics and Applications," by Geyger, pp. 1 to 15, Figs. 29, 32, 33 and 36.